R. A. B. WALSH.
APPARATUS FOR MAKING WIRE GLASS.
APPLICATION FILED DEC. 2, 1907.

940,844.

Patented Nov. 23, 1909.

Witnesses:
Geo. P. Ladson
Wells L. Church

Inventor:
Robert A. B. Walsh.
By Bakewell & Cornwall Attys.

UNITED STATES PATENT OFFICE.

ROBERT A. B. WALSH, OF ST. LOUIS, MISSOURI.

APPARATUS FOR MAKING WIRE-GLASS.

940,844.

Specification of Letters Patent.   Patented Nov. 23, 1909.

Application filed December 2, 1907.   Serial No. 404,852.

*To all whom it may concern:*

Be it known that I, ROBERT A. B. WALSH, a citizen of the United States, residing at St. Louis, Missouri, have invented a certain new and useful Improvement in Apparatus for Making Wire-Glass, of which the following is a full, clear, and exact description, such as will enable others skilled in the art to which it appertains to make and use the same, reference being had to the accompanying drawings, forming part of this specification, in which—

Figure 1:
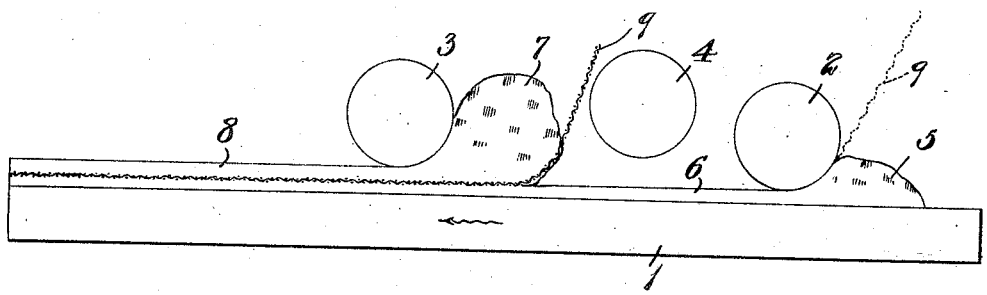
Figure 2:
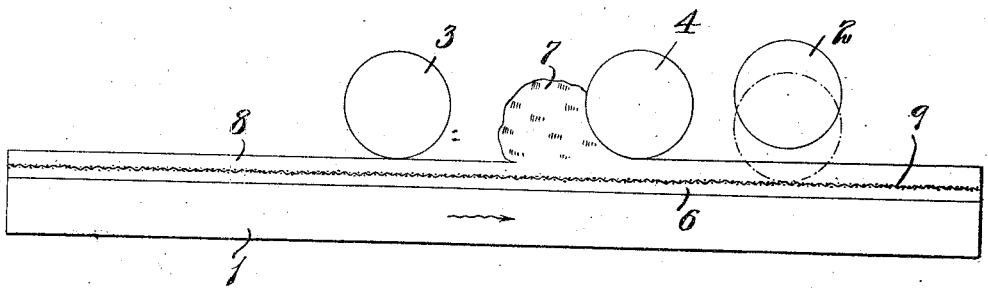

Figure 1 is a side elevation of an apparatus embodying the features of my invention; and Fig. 2 is a view similar to Fig. 1 but showing the parts of the apparatus in a different position.

This invention relates to the manufacture of wire glass and has for its object to provide an apparatus for practicing the method described in my pending application Serial No. 404,851, filed December 2, 1907.

The method described in my application above referred to consists in forming a sheet of wire glass from three separate layers of glass between two of which a wire mesh is interposed, said layers being welded together while they are in a heated condition so as to produce a single sheet.

Referring to the drawings which illustrate the apparatus which forms the subject of the present invention, 1 designates a table above which a smooth surface roller 2 is arranged, said roller being adapted to be raised or elevated for a purpose hereinafter described. A smooth surface roller 3 is also arranged above the table and intermediate the rollers 2 and 3 is a smooth surface roller 4 which is arranged above the table a distance equal to the thickness of the finished product.

To form a sheet of wire glass with an apparatus of this description I first dump a batch or mass of molten glass onto the table and then move the table in the direction of the arrow in Fig. 1, the roller 2, spreading the mass of glass 5 over the table to form a bottom layer 6. When the end of the layer 6 has arrived at a point adjacent the roller 3 a second mass 7 of molten glass is dumped onto said layer so that the roller 3 will spread a portion of said mass over the bottom layer to form a second layer 8. The end of a piece of wire mesh 9 is placed on the bottom layer 6 prior to the operation of dumping the mass of molten glass 7 onto said layer so that said mesh will be covered by the second layer at the same time said layer is being formed. After the first and second layers have been formed and the wire mesh has been arranged between them, the mesh is severed from the source of supply and the table is moved in the opposite direction, as indicated by the arrow in Fig. 2 so that the roller 4 will spread the remaining portion of the mass of glass 7 over the second layer to form a thin third layer or finishing layer, the roller 2 having been elevated into the position shown in dotted lines in Fig. 2 after the second layer was completed and before the table started to move in the direction of the arrow in Fig. 2. As the wire mesh is completely covered by the glass which forms the second layer, said mesh will not oxidize as it is not exposed to the air after it has become heated from contact with the molten glass so that said mesh will look bright and new in the finished product or sheet of glass. The wire mesh has a tendency to contract and draw the glass in which it is embedded and this produces an irregular or uneven surface on the second layer, but this uneven surface is covered by the third layer or finishing layer, so that the finished product has a smooth and brilliant surface. Preferably the third layer, or finishing layer, is not as thick as the first and second layers but is merely in the form of a comparatively thin coating that fills in the irregularities in the second layer. If desired the end of the wire mesh can be placed underneath the roller 2 as shown in dotted lines in Fig. 1 prior to the operation of dumping the mass of glass 5 onto the table so as to cause said roller to force the wire mesh into the bottom layer simultaneously with the operation of forming said layer. It is preferable however, to introduce the wire mesh in the manner shown in full lines in Fig. 1.

Having thus described my invention, what I claim is:—

1. An apparatus for forming a sheet of wire glass comprising a table, a roller arranged above said table for forming a mass of molten glass into a bottom layer, a roller arranged above the table for spreading a mass of molten glass over said bottom layer, and a third roller arranged intermediate the rollers previously referred to for spreading the remaining portion of said second mass of molten glass over the second layer to form a finishing layer or coating for the sheet of glass; substantially as described.

2. An apparatus for forming a sheet of glass comprising a table, an adjustable roller arranged above the table for forming a mass of molten glass into a bottom layer, and a pair of rollers arranged above the table and so disposed that they will spread one portion of a mass of molten glass over the bottom layer to form a second layer when the table is moved in one direction and then spread the remaining portion of said mass over the second layer to form a finishing layer when the table is moved in the opposite direction; substantially as described.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.